US010538268B2

(12) United States Patent
Talamonti et al.

(10) Patent No.: US 10,538,268 B2
(45) Date of Patent: Jan. 21, 2020

(54) STEERING-WHEEL CONTROL MECHANISM FOR AUTONOMOUS VEHICLE

(71) Applicants: Ford Global Technologies, LLC, Dearborn, MI (US); The Board of Trustees of the Leland Stanford Junior University, Stanford, CA (US)

(72) Inventors: Walter Joseph Talamonti, Dearborn, MI (US); Mishel Johns, Stanford, CA (US); Wendy Ju, Palo Alto, CA (US)

(73) Assignees: FORD GLOBAL TECHNOLOGIES, LLC, Dearborn, MI (US); THE BOARD OF TRUSTEES OF THE LELAND STANFORD JUNIOR UNIVERSITY, Stanford, CA (US)

( * ) Notice: Subject to any disclaimer, the term of this patent is extended or adjusted under 35 U.S.C. 154(b) by 163 days.

(21) Appl. No.: 15/426,106

(22) Filed: Feb. 7, 2017

(65) Prior Publication Data

US 2018/0222523 A1    Aug. 9, 2018

(51) Int. Cl.
*B62D 6/00* (2006.01)

(52) U.S. Cl.
CPC .......... *B62D 6/008* (2013.01); *B60Y 2300/12* (2013.01); *B60Y 2300/18166* (2013.01)

(58) Field of Classification Search
None
See application file for complete search history.

(56) References Cited

U.S. PATENT DOCUMENTS

| 6,209,677 | B1 | 4/2001 | Bohner et al. |
| 7,510,038 | B2 | 3/2009 | Kaufmann et al. |
| 8,660,734 | B2 | 2/2014 | Zhu et al. |
| 8,994,521 | B2 * | 3/2015 | Gazit ...................... B62D 1/28 340/425.5 |
| 2002/0092696 | A1 | 7/2002 | Bohner et al. |
| 2007/0198145 | A1 * | 8/2007 | Norris ....................... B60T 7/22 701/23 |
| 2007/0299582 | A1 | 12/2007 | Raksincharoensak et al. |
| 2010/0211270 | A1 | 8/2010 | Chin et al. |
| 2010/0228427 | A1 | 9/2010 | Anderson et al. |

(Continued)

FOREIGN PATENT DOCUMENTS

| CN | 107336707 A | 11/2017 |
| CN | 108082185 A | 5/2018 |

(Continued)

OTHER PUBLICATIONS

Search Report dated Jul. 19, 2018 from the United Kingdom Intellectual Property Office regarding Application No. GB1801826.7 (4 pages).

(Continued)

*Primary Examiner* — Rami Khatib
(74) *Attorney, Agent, or Firm* — Frank A. MacKenzie; Bejin Bieneman PLC (57) ABSTRACT

A computer in a vehicle is programmed to instruct a steering system of the vehicle to perform a lateral steering action depending on whether a steering-wheel angle is greater than a threshold angle, and to determine and apply an amount of torque to a steering wheel based on comparing the steering-wheel angle to the threshold angle.

4 Claims, 5 Drawing Sheets

(56) References Cited

U.S. PATENT DOCUMENTS

| | | | |
|---|---|---|---|
| 2013/0090825 A1* | 4/2013 | Park | B60W 30/12 |
| | | | 701/70 |
| 2015/0120121 A1* | 4/2015 | Nobumoto | B60L 11/1861 |
| | | | 701/22 |
| 2015/0346724 A1 | 12/2015 | Jones et al. | |
| 2016/0200348 A1 | 7/2016 | Lueke | |
| 2016/0200358 A1 | 7/2016 | Pastor et al. | |
| 2016/0207538 A1* | 7/2016 | Urano | B60W 30/182 |
| 2017/0203788 A1* | 7/2017 | Heo | B62D 1/286 |
| 2017/0240177 A1 | 8/2017 | Fujii et al. | |
| 2017/0274928 A1* | 9/2017 | Minaki | B62D 5/04 |
| 2017/0297578 A1* | 10/2017 | Braun | B60W 50/10 |
| 2017/0349212 A1 | 12/2017 | Oshida et al. | |
| 2018/0025645 A1* | 1/2018 | Schwindt | G01S 13/931 |
| | | | 701/301 |
| 2018/0074497 A1* | 3/2018 | Tsuji | G06K 9/00288 |
| 2018/0150074 A1* | 5/2018 | Hashimoto | G05D 1/0061 |
| 2018/0178801 A1* | 6/2018 | Hashimoto | B62D 15/025 |
| 2018/0181132 A1* | 6/2018 | Kunihiro | B62D 15/0255 |
| 2018/0194280 A1* | 7/2018 | Shibata | B60Q 9/00 |
| 2018/0201306 A1* | 7/2018 | Tsubaki | B62D 1/286 |

FOREIGN PATENT DOCUMENTS

| | | |
|---|---|---|
| DE | 102014107194 A1 | 11/2015 |
| DE | 102014220758 A1 | 4/2016 |
| DE | 102015224244 A1 | 6/2017 |
| EP | 1508495 A2 | 2/2005 |
| EP | 3254919 A1 | 12/2017 |
| JP | 2000198458 A | 7/2000 |
| JP | 200575014 A | 3/2005 |
| WO | WO 2016023756 A1 | 2/2016 |
| WO | 2016058804 A1 | 4/2016 |

OTHER PUBLICATIONS

Non-Final Office Action dated Jun. 15, 2018 for U.S. Appl No. 15/426,104 (18 pages).
GB Search Report dated Jul. 26, 2018 re GB Appl. No. 1801850.7.

* cited by examiner

STEERING-WHEEL CONTROL MECHANISM FOR AUTONOMOUS VEHICLE

BACKGROUND

The Society of Automotive Engineers (SAE) has defined multiple levels of autonomous vehicle operation. At levels 0-2, a human driver monitors or controls the majority of the driving tasks, often with no help from the vehicle. At level 0 ("no automation"), a human driver is responsible for all vehicle operations. At level 1 ("driver assistance"), the vehicle sometimes assists with steering, acceleration, or braking, but the driver is still responsible for the vast majority of the vehicle control. At level 2 ("partial automation"), the vehicle can control steering, acceleration, and braking under certain circumstances without human interaction. At levels 3-5, the vehicle assumes more driving-related tasks. At level 3 ("conditional automation"), the vehicle can handle steering, acceleration, and braking under certain circumstances, as well as monitoring of the driving environment. Level 3 requires the driver to intervene occasionally, however. At level 4 ("high automation"), the vehicle can handle the same tasks as at level 3 but without relying on the driver to intervene in certain driving modes. At level 5 ("full automation"), the vehicle can handle almost all tasks without any driver intervention.

DETAILED DESCRIPTION

With reference to the Figures, wherein like numerals indicate like parts throughout the several views, a computer 32 in a vehicle 30 is programmed to instruct a steering system 34 to perform a lateral steering action depending on whether a steering-wheel angle θ is greater than a threshold angle, and determine and apply an amount of torque T to a steering wheel 36 based on comparing the steering-wheel angle θ to the threshold angle. A lateral steering action is a purposeful lateral movement of the vehicle 30 relative to a lane in which the vehicle 30 is traveling, for example, changing lanes, adjusting a lateral position within the lane, exiting from a freeway to an offramp, making a turn, etc.

The computer 32 as programmed provides a human driver of the vehicle 30 with an intuitive way to give high-level instructions to the vehicle 30 while the vehicle 30 operates autonomously or semi-autonomously. At the same time, the computer 32 is more likely to properly ignore spurious inputs, and the computer 32 provides haptic feedback in an intuitive manner that allows the human driver to more likely give the correct instructions to the vehicle 30.

The vehicle 30 may be an autonomous vehicle. The computer 32 may be capable of operating the vehicle 30 independently of the intervention of a human driver, completely or to a greater or a lesser degree. The computer 32 may be programmed to operate a propulsion system 40, brake system 42, steering system 34, and/or other vehicle systems.

For purposes of this disclosure, an autonomous mode is defined as one in which each of the propulsion system 40, the brake system 42, and the steering system 34 of the vehicle 30 are controlled by the computer 32; in a semi-autonomous mode the computer 32 of the vehicle 30 controls one or two of the propulsion system 40, the brake system 42, and the steering system 34. By way of context, the SAE has defined multiple levels of autonomous vehicle operation, as described in the Background. Thus, in one example, nonautonomous modes of operation according to the present disclosure may include levels 0-1, semi-autonomous modes of operation may include levels 2-3, and fully autonomous modes of operation may include levels 4-5.

Figure 1:
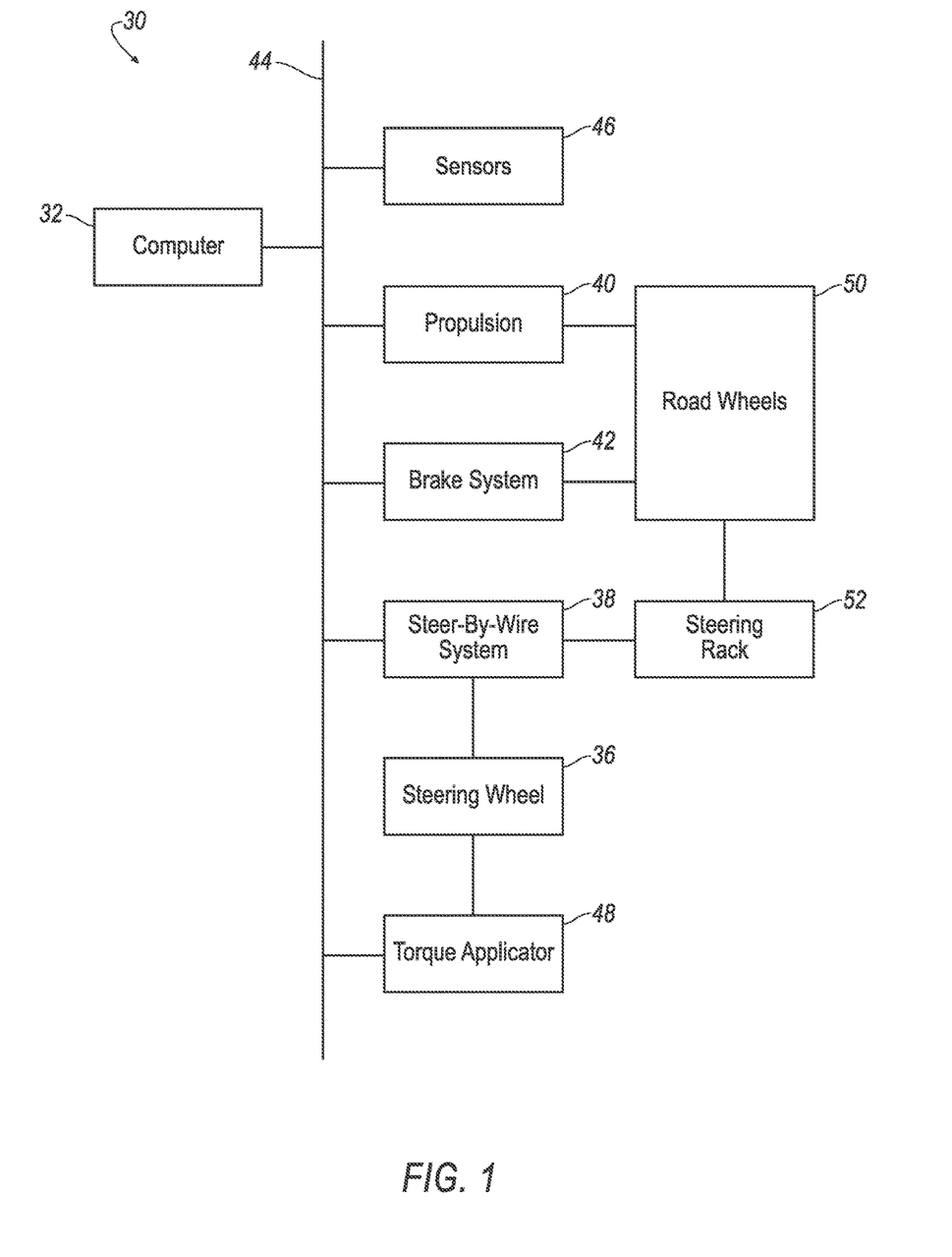
FIG. 1 is a block diagram of an exemplary vehicle.

With reference to FIG. 1, the computer 32 is included in the vehicle 30 for carrying out various operations, including as described herein. The computer 32 is a computing device that generally includes a processor and a memory, the memory including one or more forms of computer-readable media, and storing instructions executable by the processor for performing various operations, including as disclosed herein. The memory of the computer 32 further generally stores remote data received via various communications mechanisms; e.g., the computer 32 is generally configured for communications on a communications network 44 within the vehicle 30. The computer 32 may also have a connection to an onboard diagnostics connector (OBD-II). Although one computer 32 is shown in FIG. 1 for ease of illustration, it is to be understood that the computer 32 could include, and various operations described herein could be carried out by, one or more computing devices.

The computer 32 may transmit signals through the communications network 44, which may be a controller area network (CAN) bus, Ethernet, Local Interconnect Network (LIN), Bluetooth, and/or by any other wired or wireless communications network. The computer 32 may be in communication with sensors 46, the propulsion system 40, the brake system 42, and components of the steering system 34 such as a steer-by-wire system 38 and a torque applicator 48.

With continued reference to FIG. 1, the propulsion system 40 of the vehicle 30 generates energy and translates the energy into motion of the vehicle 30. The propulsion system 40 may be a known vehicle propulsion subsystem, for example, a powertrain including an internal-combustion engine coupled to a transmission that transfers rotational motion to road wheels 50; an electric powertrain including batteries, an electric motor, and a transmission that transfers rotational motion to the road wheels 50; a hybrid powertrain including elements of the conventional powertrain and the electric powertrain; or any other type of propulsion. The propulsion system 40 can include an electronic control unit (ECU) or the like that is in communication with and receives input from the computer 32 and/or a human driver. The human driver may control the propulsion system 40 via, e.g., an accelerator pedal and/or a gear-shift lever.

The brake system 42 is typically a known vehicle braking subsystem and resists the motion of the vehicle 30 to thereby slow and/or stop the vehicle 30, for example by resisting the rotation of the road wheels 50. The brake system 42 may be friction brakes such as disc brakes, drum brakes, band brakes, etc.; regenerative brakes; any other suitable type of brakes; or a combination. The brake system 42 can include an electronic control unit (ECU) or the like that is in communication with and receives input from the computer 32 and/or a human driver. The human driver may control the brake system 42 via, e.g., a brake pedal.

With continued reference to FIG. 1, the steering system 34 is typically a known vehicle steering subsystem and controls the turning of the road wheels 50. The steering system 34 may be a rack-and-pinion system with electric power-assisted steering, a system using steer-by-wire, as both are known, or any other suitable system. The steering system 34 can include an electronic control unit (ECU) or the like that is in communication with and receives input from the computer 32 and/or a human driver. The steering system 34 may include the steering wheel 36 by which the human driver may control the steering system 34. For a steering system 34 using steer-by-wire, the steering system 34 may include a steering rack 52 coupled to the road wheels 50, the steer-by-wire system 38, the steering wheel 36, and the torque applicator 48.

Figure 2:
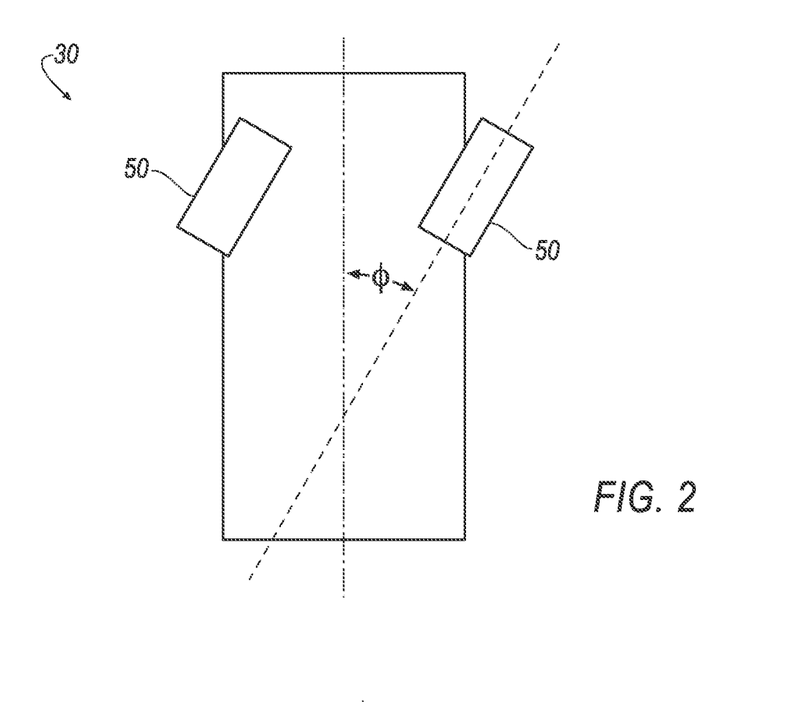
FIG. 2 is a top view of the vehicle of FIG. 1.

The steering rack 52 is connected to the steer-by-wire system 38, and the steering rack 52 is coupled to the road wheels 50. The steering rack 52 may be connected to the steer-by-wire system 38 via, e.g., electromechanical actuators (not shown) that transform an electrical signal into mechanical motion of the steering rack 52. The position of the steering rack 52 determines the turning of the road wheels 50. As shown in FIG. 2, the road wheels 50 have a steering angle $\varphi$, that is, an angle that the road wheels 50 are turned relative to the rest of the vehicle 30. The steering angle $\varphi$ may be measured relative to a vehicle-forward direction. For example, when the road wheels 50 are turned straight forward, the steering angle $\varphi$ is zero; when the road wheels 50 are turned to the right, the steering angle $\varphi$ has a positive value; and when the road wheels 50 are turned to the left, the steering angle $\varphi$ has a negative value.

The steer-by-wire system 38 may be connected to the steering rack 52 as described and connected to the steering wheel 36. The steer-by-wire system 38 may include a wiring harness and the ECU (not shown) in communication with the steering rack 52 and the steering wheel 36. In other words, there is no mechanical connection between the steering wheel 36 and the steering rack 52, only an electrical connection.

Figure 3:
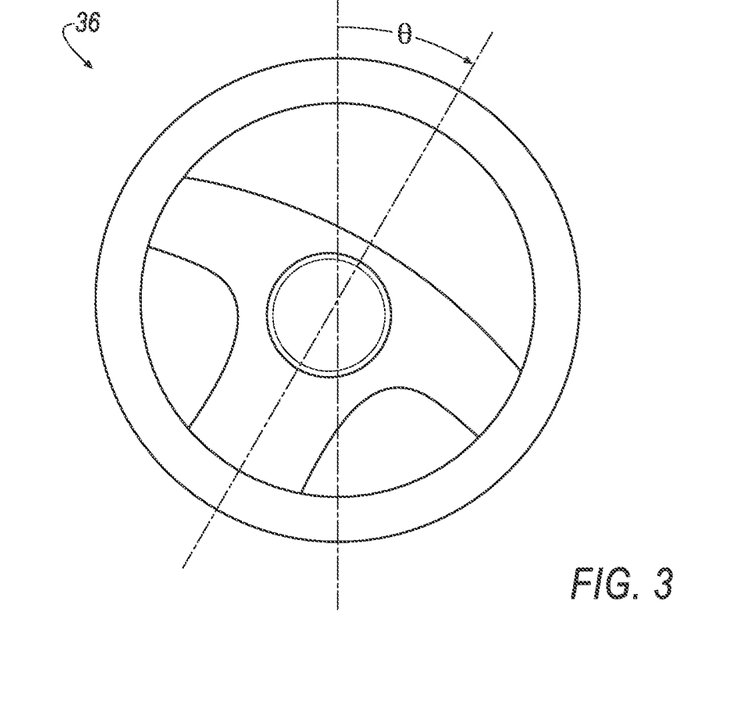
FIG. 3 is a front view of a steering wheel of the vehicle of FIG. 1.

The steering wheel 36 may be rotatably coupled to an instrument panel (not shown) facing a seat for a human driver. As shown in FIG. 3, the steering wheel 36 has a steering-wheel angle $\theta$. The steering-wheel angle $\theta$ may be measured relative to a reference angle, such as when the steering wheel 36 is centered. For example, when the steering wheel 36 is centered, the steering-wheel angle $\theta$ is zero; when the steering wheel 36 is rotated to the right, the steering-wheel angle $\theta$ has a positive value; and when the steering wheel 36 is rotated to the left, the steering-wheel angle $\theta$ has a negative value. The steer-by-wire system 38 may detect the steering-wheel angle $\theta$ via a position sensor (not shown), e.g., a Hall effect sensor, a rotary encoder, etc.

The torque applicator 48 is in communication with the computer 32 and coupled to the steering wheel 36, e.g., via a steering column (not shown). The torque applicator 48 may apply a torque T to the steering wheel 36, causing or resisting rotation of the steering wheel 36. The torque T applied by the torque applicator 48 is variable, and the computer 32 may instruct the torque applicator 48 to apply a particular level of torque T to the steering wheel 36. The torque applicator 48 may be, for example, an electric motor.

With continued reference to FIG. 1, the vehicle 30 may include the sensors 46. The sensors 46 may detect internal states of the vehicle 30, for example, wheel speed, wheel orientation, and engine and transmission variables. The sensors 46 may detect the position or orientation of the vehicle 30, for example, global positioning system (GPS) sensors; accelerometers such as piezo-electric or microelectromechanical systems (MEMS); gyroscopes such as rate, ring laser, or fiber-optic gyroscopes; inertial measurements units (IMU); and magnetometers. The sensors 46 may detect the external world; for example, the sensors 46 can include one or more of radar sensors, scanning laser range finders, light detection and ranging (LIDAR) devices, and image processing sensors such as cameras. The sensors 46 may include communications devices, for example, vehicle-to-infrastructure (V2I) or vehicle-to-vehicle (V2V) devices.

Figure 4:
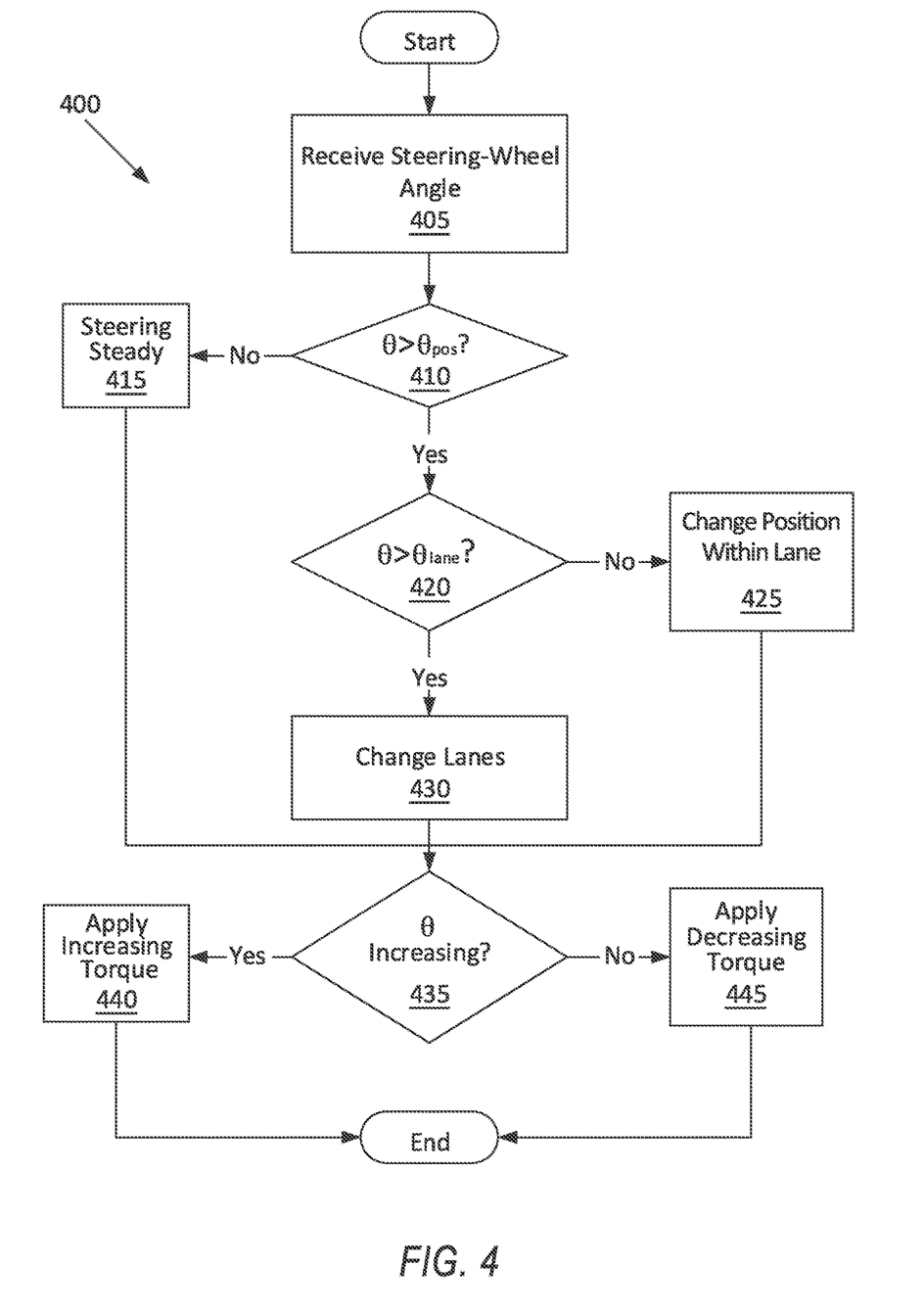
FIG. 4 is a process flow diagram of an exemplary process for receiving input through the steering wheel of the vehicle of FIG. 1.

FIG. 4 is a process flow diagram illustrating an exemplary process 400 for the steering wheel 36 to accept input for the computer 32 to operate the vehicle 30. The computer 32 may be programmed with the steps of the process 400. The computer 32 may use the process 400 when the vehicle 30 is operating fully autonomously, or when the vehicle 30 is operating semi-autonomously. The computer 32 may use the process 400 when operating the vehicle 30 along a highway or a controlled-access freeway or tollway. In performing the process 400, the computer 32 may use an absolute value of the steering-wheel angle $\theta$, that is, the steering-wheel angle $\theta$ when rotating to the right from the reference position or the steering-wheel angle $\theta$ when rotating to the left from the reference position. Although the process 400 refers to changing lanes and adjusting the lateral position of the vehicle 30 within a lane, the process 400 could be modified to apply to other lateral steering actions of the vehicle 30.

The process 400 begins in a block 405, in which the computer 32 receives the steering-wheel angle $\theta$ from the steering wheel 36. The steering wheel 36 may have been turned to the steering-wheel angle $\theta$ by the human driver.

Next, in a decision block 410, the computer 32 determines whether the steering-wheel angle $\theta$ is above a position threshold $\theta_{pos}$. The position threshold $\theta_{pos}$ may be chosen to be larger than a steering-wheel angle $\theta$ caused by inadvertent touches of the steering wheel 36 by the human driver but smaller than the human driver would intuitively associate with changing lanes. Empirical testing can be done to establish the position threshold $\theta_{pos}$.

The position threshold $\theta_{pos}$ may vary with a vehicle speed, for example, by decreasing with increasing speed, or the position threshold $\theta_{pos}$ may be constant with vehicle speed. The position threshold $\theta_{pos}$ may vary with a duration that the steering-wheel angle $\theta$ is held, for example, by decreasing if the steering-wheel angle $\theta$ is held above zero for, e.g., two seconds. The position threshold $\theta_{pos}$ may vary with roadway type, for example, by having a higher value for a controlled-access road than for a noncontrolled-access road. A controlled-access highway for purposes of this disclosure means a highway that is designed for continuous (nonstopping absent a traffic jam) traffic flow and therefore does not have stop-lights or stop-signs. For example, a controlled-access highway can be accessed only by entrance and exits ramps that allow vehicles to merge onto the highway and/or exit without stopping or substantially slowing until on the ramp. A noncontrolled-access road, in contrast, is designed for traffic to stop and start and can be accessed by vehicles turning onto and off of the road, possibly from a stop. A noncontrolled-access road may have stoplights and/or stop-signs. If the steering-wheel angle $\theta$ is above the position threshold $\theta_{pos}$, the process 400 continues in a decision block 420.

If the steering-angle is below the position threshold $\theta_{pos}$, next, in a block 415, the computer 32 ignores the angle $\theta$, i.e., keeps the steering steady; that is, the computer 32 ignores the steering-wheel angle $\theta$ and continues operating the vehicle 30 autonomous or semi-autonomously without changing based on the steering-wheel angle $\theta$. After the block 415, the process 400 proceeds to a decision block 435, described below.

After the decision block 410, if the steering-wheel angle $\theta$ is above the position threshold $\theta_{pos}$, next, in a decision block 420, the computer 32 determines whether the steering-wheel angle $\theta$ is above a lane-change threshold $\theta_{lane}$. The lane-change threshold $\theta_{lane}$ may be chosen by a system designer to be sufficiently large that a human driver intuitively associates angles above the lane-change threshold $\theta_{lane}$ with steering the vehicle 30, e.g., changing lanes. The lane-change threshold $\theta_{lane}$ may vary with, e.g., the vehicle speed, duration of holding the steering-wheel angle $\theta$, and/or roadway type, as described above for the position threshold $\theta_{pos}$. If the steering-wheel angle $\theta$ is above the lane-change threshold $\theta_{lane}$, the process 400 continues in a block 430.

If the steering-wheel angle $\theta$ is below the lane-change threshold $\theta_{lane}$, next, in a block 425, the computer 32 instructs the steering system 34 to adjust a vehicle position within a lane. In other words, the computer 32 instructs the steering system 34 to adjust the vehicle position within the lane depending on whether the steering-wheel angle $\theta$ is above the position threshold $\theta_{pos}$ and below the lane-change threshold $\theta_{lane}$. The vehicle position within the lane refers to a lateral position of the vehicle 30 relative to lane boundaries to the left and to the right of the vehicle 30. For example, the steering system 34 may adjust the vehicle position within the lane to be closer to the left lane boundary and farther from the right lane boundary. After the block 425, the process 400 proceeds to the decision block 435. Thus, the vehicle 30 may be able to, e.g., avoid a pothole or move away from large or erratically driven vehicles in an adjacent lane.

After the decision block 420, if the steering-wheel angle $\theta$ is above the lane-change threshold $\theta_{lane}$, next, in the block 430, the computer 32 instructs the steering system 34, as well as the propulsion system 40 and the brake system 42, to change lanes. In other words, the computer 32 instructs the steering system 34 to change lanes depending on whether the steering-wheel angle $\theta$ is greater than the lane-change threshold $\theta_{lane}$. The computer 32 may instruct a turn signal to activate and may check whether an adjacent lane into which the vehicle 30 may move is open, that is, free from other vehicles, according to the programming of the computer 32 for autonomous or semi-autonomous operation of the vehicle 30, as is known. Once the adjacent lane is open, the computer 32 may instruct the steering system 34 to turn the road wheels 50 to move the vehicle 30 into the adjacent lane and then instruct the steering system 34 to straighten the road wheels 50. The computer 32 may use the propulsion system 40 and/or the brake system 42 to adjust the position of the vehicle 30 relative to other vehicles or obstacles on the road, as is known. Thus, the vehicle 30 may be able to, e.g., move into a lane that the human driver is more comfortable with, overtake a slower vehicle, or move out of the way of a faster vehicle.

After the block 415, the block 425, or the block 430, next, in the decision block 435, the computer 32 determines whether the steering-wheel angle $\theta$ is increasing, that is, whether the steering wheel 36 is rotating farther away from the reference position. The computer 32 may compare the current steering-wheel angle $\theta(t)$ with the steering-wheel angle of an immediately prior time step, $\theta(t-1)$. If $\theta(t) > \theta$(t−1), the steering-wheel angle $\theta$ is increasing; if $\theta(t) < \theta$(t−1), the steering-wheel angle $\theta$ is decreasing. If the steering-wheel angle $\theta$ is decreasing, that is, if the steering wheel 36 is rotating toward the reference position, the process 400 proceeds to a block 445.

If the steering-wheel angle $\theta$ is increasing, next, in a block 440, the computer 32 determines and applies an amount of torque T to the steering wheel 36. The computer 32 determines the amount of torque T based on comparing the steering-wheel angle $\theta$ to the position threshold $\theta_{pos}$ and/or the lane-change threshold $\theta_{lane}$, as explained in more detail below. The computer 32 instructs the torque applicator 48 to apply that amount of torque T to the steering wheel 36.

Figure 5:
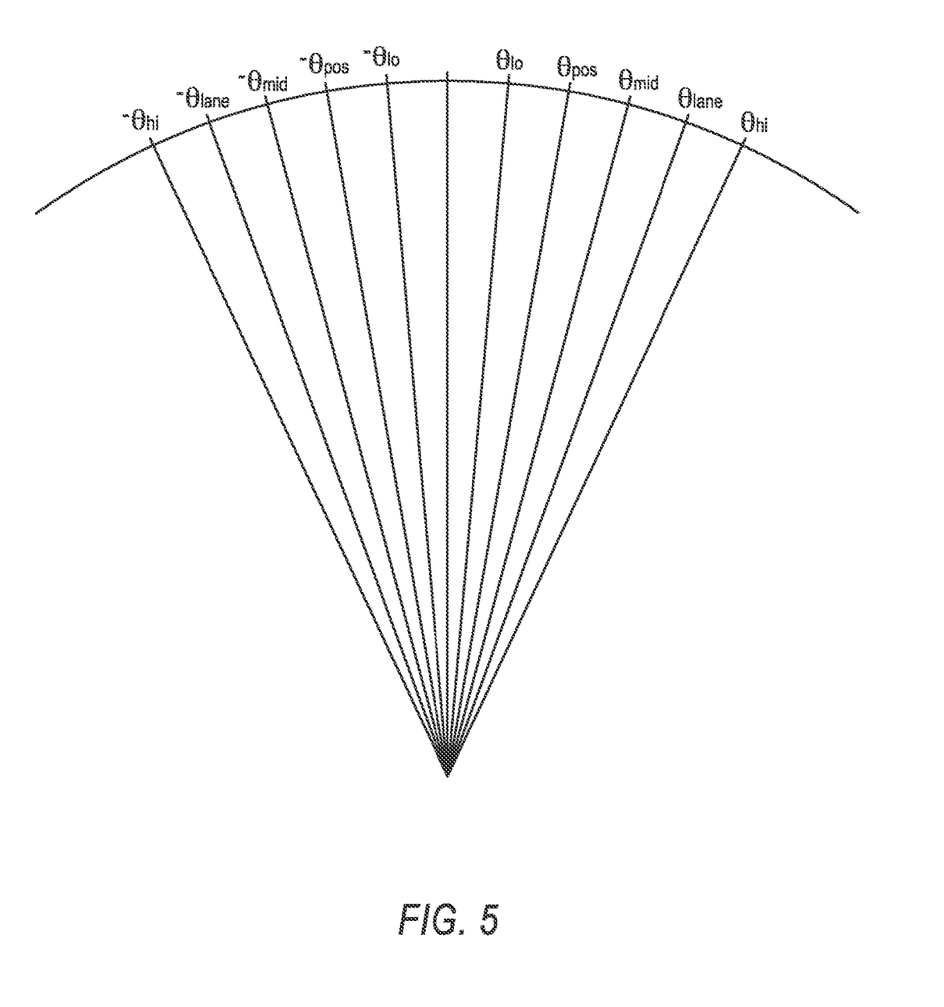
FIG. 5 is a diagram of a coordinate system of the steering wheel of the vehicle of FIG. 1.

FIG. 5 shows an example coordinate system for the steering-wheel angle $\theta$, including the reference angle and, rotating to the right, a lower boundary angle $\theta_{lo}$, the position threshold $\theta_{pos}$, a middle boundary angle $\theta_{mid}$, the lane-change threshold $\theta_{lane}$, and a higher boundary angle $\theta_{hi}$.

Figure 6:
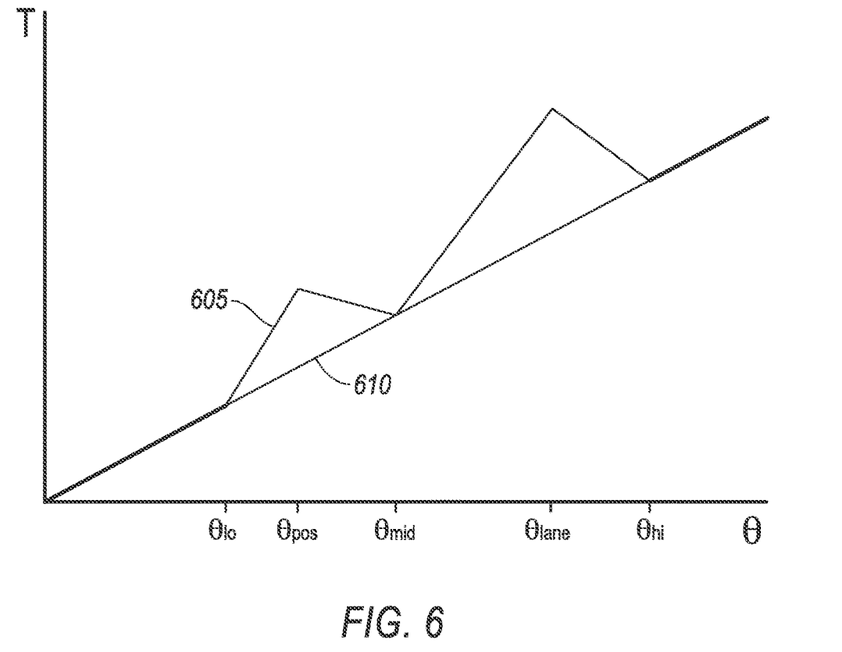
FIG. 6 is a graph of torque versus steering-wheel angle of the steering wheel of the vehicle of FIG. 1.

FIG. 6 shows an example graph of torque T versus steering-wheel angle $\theta$. For example, the amount of torque T applied to the steering wheel 36 may increase as the steering-wheel angle $\theta$ increases from the reference angle to the lane-change threshold $\theta_{lane}$ and may decrease as the steering-wheel angle $\theta$ increases above the threshold angle away from the reference angle to the higher boundary angle $\theta_{hi}$. For another example, as shown by an increasing curve 605 in FIG. 6, the amount of torque T may increase as the steering-angle increases from the lower boundary angle $\theta_{lo}$ to the position threshold $\theta_{pos}$, decrease as the steering-wheel angle $\theta$ increases above the position threshold $\theta_{pos}$ away from the reference angle to the middle boundary angle $\theta_{mid}$, increase as the steering-wheel angle $\theta$ increases above the middle boundary angle $\theta_{mid}$ away from the reference angle to the lane-change threshold $\theta_{lane}$, and decrease as the steering-wheel angle $\theta$ increases above the lane-change threshold $\theta_{lane}$ away from the reference angle to the higher boundary angle $\theta_{hi}$. The boundary angles $\theta_{lo}$, $\theta_{mid}$, $\theta_{hi}$ may vary with the vehicle speed, duration of holding the steering-wheel angle $\theta$, and/or roadway type, as described above for the position threshold $\theta_{pos}$. More specifically, the increasing and decreasing sections of torque may be linear, for example, $$T(\theta) = \begin{cases} a\theta & \theta < \theta_{lo}, \theta \geq \theta_{hi} \\ b\theta - c & \theta_{lo} \leq \theta < \theta_{pos} \\ -d\theta + e & \theta_{pos} \leq \theta < \theta_{mid} \\ f\theta - g & \theta_{mid} \leq \theta < \theta_{lane} \\ -h\theta + i & \theta_{lane} \leq \theta < \theta_{hi} \end{cases}$$

in which the constants a, b, c, d, e, f, g, h, and i are positive values. The constants may be chosen so that the function for the torque is continuous and may be determined through empirical testing to be values that are noticeable but not distracting to the human driver.

As another example, the increasing section of torque may include derivative and integral terms as part of a control loop:

$$T(\theta) = K_d * \frac{d\theta}{dt} + K_i * \int_{t-\Delta t}^{t} \theta \, dt + \begin{cases} a\theta & \theta < \theta_{lo}, \theta \geq \theta_{hi} \\ b\theta - c & \theta_{lo} \leq \theta < \theta_{pos} \\ -d\theta + e & \theta_{pos} \leq \theta < \theta_{mid} \\ f\theta - g & \theta_{mid} \leq \theta < \theta_{lane} \\ -h\theta + i & \theta_{lane} \leq \theta < \theta_{hi} \end{cases}$$

in which the constants a, b, c, d, e, f, g, h, and i are positive values; $K_d$ and $K_i$ are scaling constants; and $\Delta t$ is a duration over which to calculate the integral. The derivative and integral terms in the preceding equation serve to keep the movement of the steering wheel 36 stable.

Figure 7:
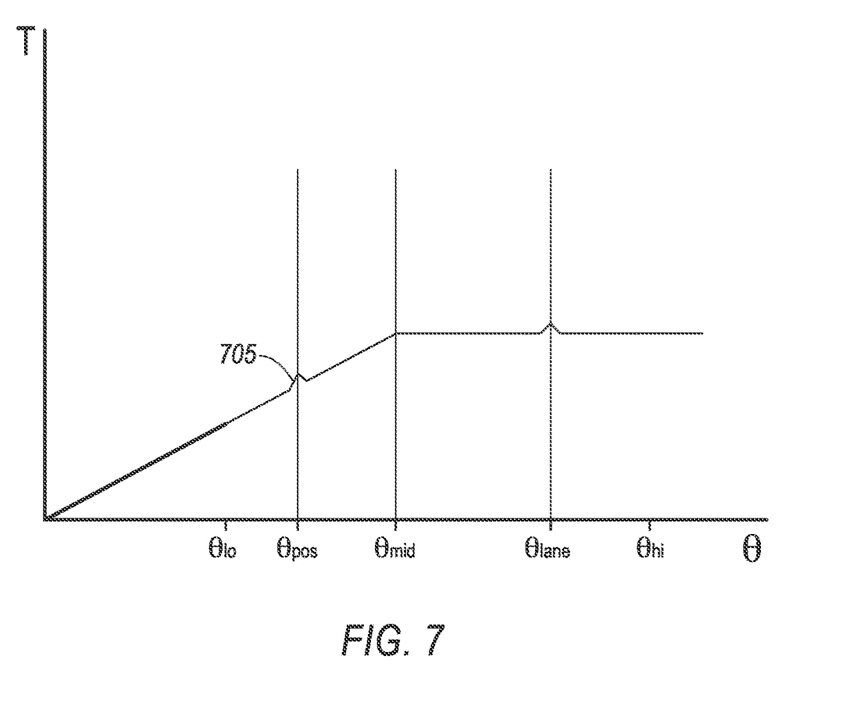
FIG. 7 is an alternative graph of torque versus steering-wheel angle of the steering wheel of the vehicle of FIG. 1.

As a third example, with reference to FIG. 7, the torque T may increase linearly up to a constant and have torque bumps around the position threshold $\theta_{pos}$ and the lane-change threshold $\theta_{lane}$:

$$T(\theta) = K_d * \frac{d\theta}{dt} + K_i * \int_{t-\Delta t}^{t} \theta \, dt + \begin{cases} a\theta & \theta < \theta_{mid} \\ b & \theta_{mid} \leq \theta \end{cases} + \begin{cases} 0 & \theta < \theta_{pos} - \Delta\theta \\ -K_b * (|\theta - \theta_{pos}| - \Delta\theta) & \theta_{pos} - \Delta\theta \leq \theta < \theta_{pos} + \Delta\theta \\ 0 & \theta_{pos} + \Delta\theta \leq \theta < \theta_{lane} - \Delta\theta \\ -K_b * (|\theta - \theta_{lane}| - \Delta\theta) & \theta_{lane} - \Delta\theta \leq \theta < \theta_{lane} + \Delta\theta \\ 0 & \theta_{lane} + \Delta\theta \leq \theta \end{cases}$$

in which the constants a, b are positive values; $K_d$, $K_i$, and $K_b$ are scaling constants; $\Delta t$ is a duration over which to calculate the integral; and $\Delta\theta$ is half of a width of the torque bumps. FIG. 7 shows an increasing curve 705 corresponding to the preceding equation (omitting the effects of the derivative and integral terms).

After the decision block 435, if the steering-wheel angle $\theta$ is decreasing, next, in the block 445, the computer 32 applies torque T to the steering wheel 36, that is, instructs the torque applicator 48 to apply an amount of torque T to the steering wheel 36 based on the steering-wheel angle $\theta$. For example, as shown by a decreasing curve 610 in FIG. 6, the amount of torque T may decrease monotonically as the steering-wheel angle $\theta$ decreases from the higher boundary angle to the reference angle; in other words, the amount of torque T may decrease without increasing as the steering-wheel angle $\theta$ decreases toward the reference angle.

The process 400 ends following one of the blocks 440, 445.

In general, the computing systems and/or devices described may employ any of a number of computer operating systems, including, but by no means limited to, versions and/or varieties of the Ford Sync® application, AppLink/Smart Device Link middleware, the Microsoft Automotive® operating system, the Microsoft Windows® operating system, the Unix operating system (e.g., the Solaris® operating system distributed by Oracle Corporation of Redwood Shores, Calif.), the AIX UNIX operating system distributed by International Business Machines of Armonk, N.Y., the Linux operating system, the Mac OSX and iOS operating systems distributed by Apple Inc. of Cupertino, Calif., the BlackBerry OS distributed by Blackberry, Ltd. of Waterloo, Canada, and the Android operating system developed by Google, Inc. and the Open Handset Alliance, or the QNX® CAR Platform for Infotainment offered by QNX Software Systems. Examples of computing devices include, without limitation, an on-board vehicle computer, a computer workstation, a server, a desktop, notebook, laptop, or handheld computer, or some other computing system and/or device.

Computing devices generally include computer-executable instructions, where the instructions may be executable by one or more computing devices such as those listed above. Computer executable instructions may be compiled or interpreted from computer programs created using a variety of programming languages and/or technologies, including, without limitation, and either alone or in combination, Java™, C, C++, Matlab, Simulink, Stateflow, Visual Basic, Java Script, Perl, HTML, etc. Some of these applications may be compiled and executed on a virtual machine, such as the Java Virtual Machine, the Dalvik virtual machine, or the like. In general, a processor (e.g., a microprocessor) receives instructions, e.g., from a memory, a computer readable medium, etc., and executes these instructions, thereby performing one or more processes, including one or more of the processes described herein. Such instructions and other data may be stored and transmitted using a variety of computer readable media. A file in a computing device is generally a collection of data stored on a computer readable medium, such as a storage medium, a random access memory, etc.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random access memory (DRAM), which typically constitutes a main memory. Such instructions may be transmitted by one or more transmission media, including coaxial cables, copper wire and fiber optics, including the wires that comprise a system bus coupled to a processor of a ECU. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

In the drawings, the same reference numbers indicate the same elements. Further, some or all of these elements could be changed. With regard to the media, processes, systems, methods, heuristics, etc. described herein, it should be understood that, although the steps of such processes, etc.

have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claims.

Accordingly, it is to be understood that the above description is intended to be illustrative and not restrictive. Many embodiments and applications other than the examples provided would be apparent to those of skill in the art upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future embodiments. In sum, it should be understood that the invention is capable of modification and variation and is limited only by the following claims.

All terms used in the claims are intended to be given their plain and ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. A computer comprising a processor and a memory storing instructions executable by the processor to:
    instruct a steering system to perform a lane change upon a steering-wheel angle being greater than a lane-change threshold angle;
    instruct the steering system to adjust a vehicle position within a lane depending on whether the steering-wheel angle is above a position threshold angle and below the lane-change threshold angle; and
    determine and apply an amount of torque to a steering wheel based on comparing the steering-wheel angle to the lane-change threshold angle;
    wherein the amount of torque increases as the steering-wheel angle increases from a reference angle to the position threshold angle;
    the amount of torque decreases as the steering-wheel angle increases above the position threshold angle away from the reference angle to a middle boundary angle;
    the amount of torque increases as the steering-wheel angle increases above the middle boundary angle away from the reference angle to the lane-change threshold angle; and
    the amount of torque decreases as a function of the steering-wheel angle as the steering-wheel angle increases above the lane-change threshold angle away from the reference angle to a higher boundary angle.

2. The computer of claim 1, wherein the lane-change threshold angle varies with a vehicle speed.

3. A method comprising:
    instructing a steering system to perform a lane change upon a steering-wheel angle being greater than a lane-change threshold angle;
    instructing the steering system to adjust a vehicle position within a lane depending on whether the steering-wheel angle is above a position threshold angle and below the lane-change threshold angle; and
    determining and applying an amount of torque to a steering wheel based on comparing the steering-wheel angle to the lane-change threshold angle;
    wherein the amount of torque increases as the steering-wheel angle increases from a reference angle to the position threshold angle;
    the amount of torque decreases as the steering-wheel angle increases above the position threshold angle away from the reference angle to a middle boundary angle;
    the amount of torque increases as the steering-wheel angle increases above the middle boundary angle away from the reference angle to the lane-change threshold angle; and
    the amount of torque decreases as a function of the steering-wheel angle as the steering-wheel angle increases above the lane-change threshold angle away from the reference angle to a higher boundary angle.

4. The method of claim 3, wherein the lane-change threshold angle varies with a vehicle speed.

* * * * *